G. LEFEVRE.
TEA OR COFFEE POT.
APPLICATION FILED SEPT. 27, 1912.

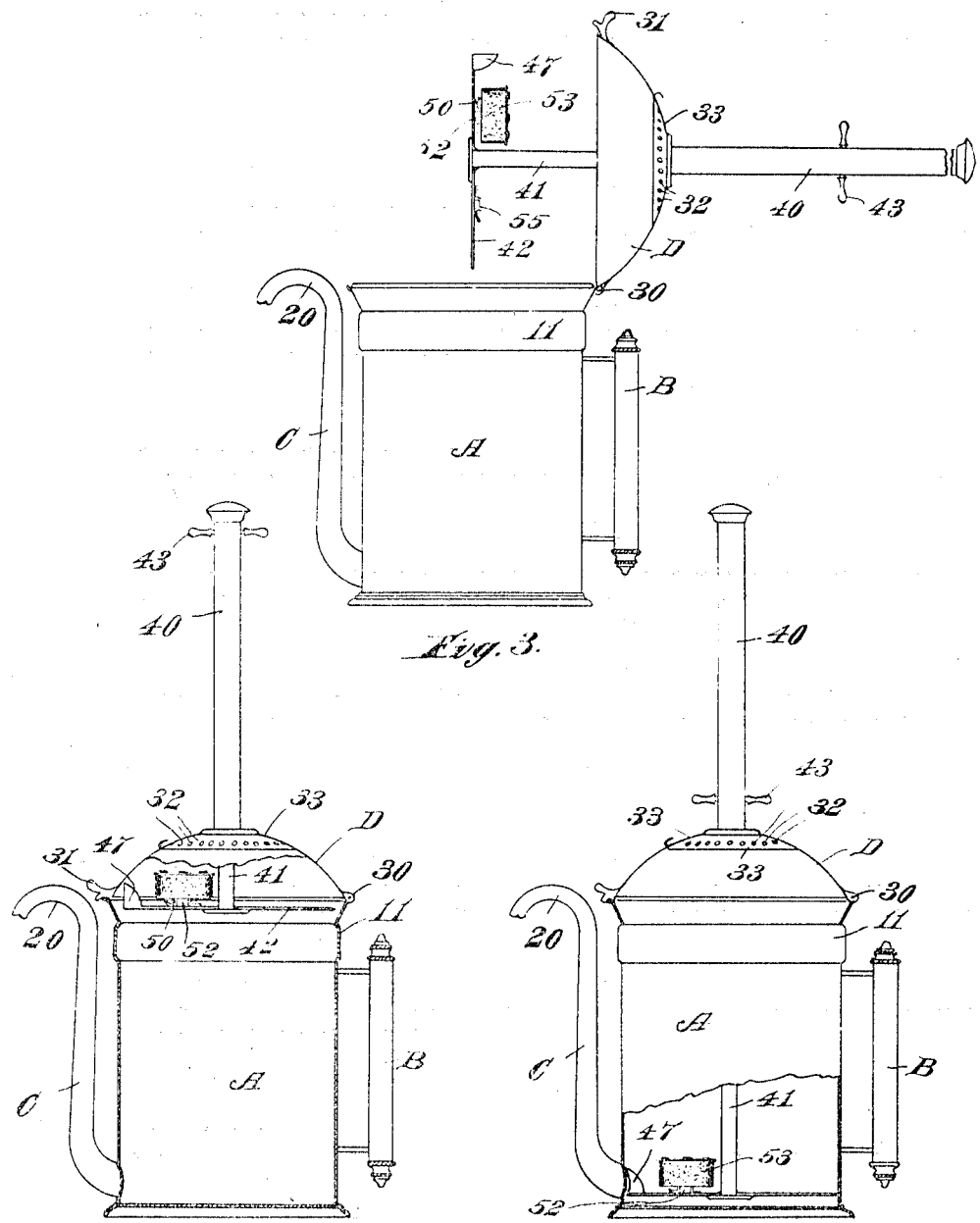

1,053,735.

Patented Feb. 18, 1913.

3 SHEETS—SHEET 3.

WITNESSES:

Ludger A. Nicol.
Vera J. Durrian

INVENTOR.
George Lefevre
BY
Gardner W. Pearson
ATTORNEY.

UNITED STATES PATENT OFFICE.

GEORGE LEFEVRE, OF LAWRENCE, MASSACHUSETTS.

TEA OR COFFEE POT.

1,053,735.

Specification of Letters Patent.

Patented Feb. 18, 1913.

Application filed September 27, 1912. Serial No. 722,739.

*To all whom it may concern:*

Be it known that I, GEORGE LEFEVRE, a citizen of Canada, residing at Lawrence, in the county of Essex and State of Massachusetts, have invented certain new and useful Improvements in Tea or Coffee Pots, of which the following is a specification.

My invention relates to improvements in utensils for making tea, coffee and other similar beverages. It is a utensil which can be used for making either tea, coffee or other beverage and it is adapted to regulate the strength of the infusion according to taste.

Another object of my invention is to provide a pot of such character that the liquid contained therein can be discharged without lifting the pot from the stove and the tea or coffee container can be readily removed for cleaning.

Figure 1:
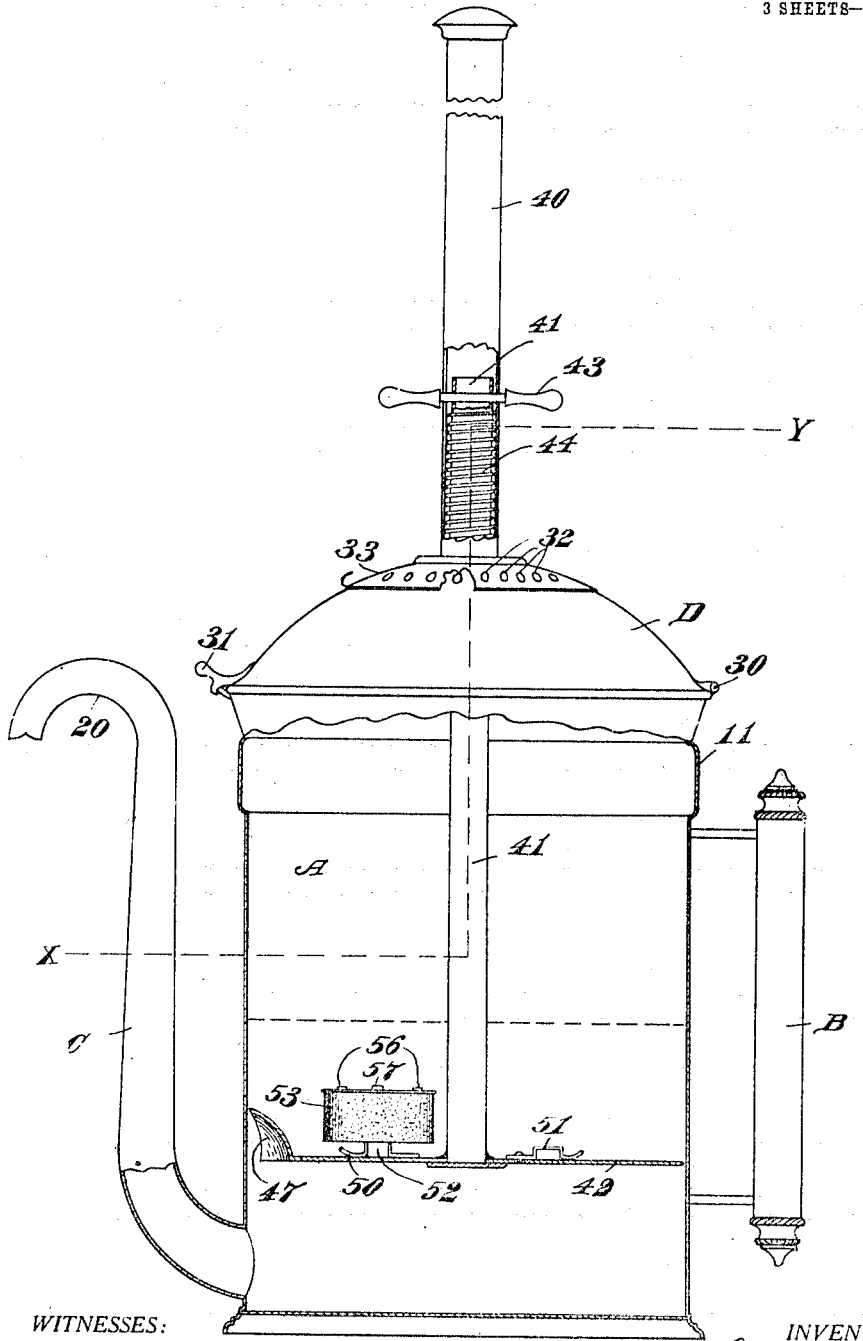
Figure 2:
Figure 6:
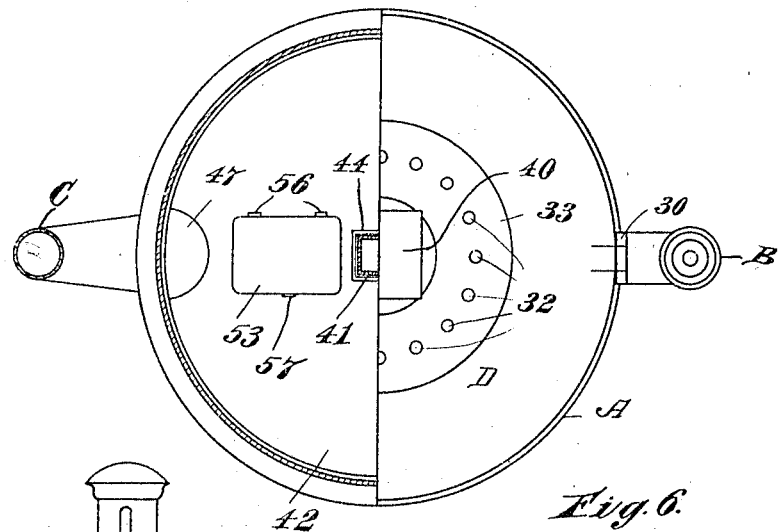
Figure 8:
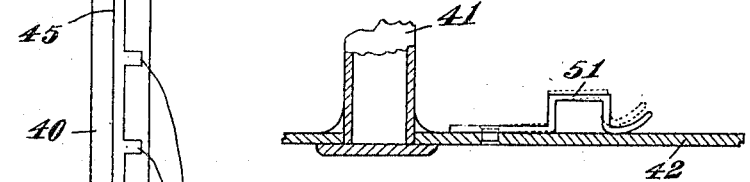
Figure 7:
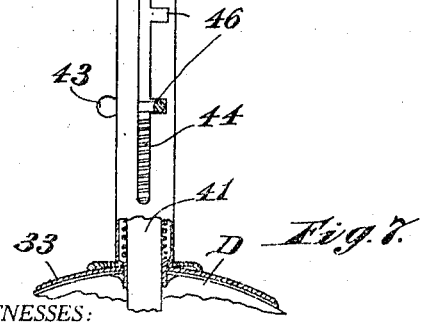

In the drawings, Figure 1 is a sectional elevation of my device with the carrier down. Fig. 2 is an elevation of a smaller container than the one shown in Fig. 1. Fig. 3 is an elevation showing the top open with the carrier and container pressed down in position to be cleaned or in position for the container to be removed or refilled. Fig. 4 is an elevation showing the carrier and container at their upper position and Fig. 5 is an elevation showing the container at their lowest position. Fig. 6 is a partial sectional plan view on the line X—Y of Fig. 1. Fig. 7 is a detail of the carrier rod and guide, and Fig. 8 is a detail of the carrier and of the container spring.

A represents the body of the pot; B the handle; C the spout and D the cover.

The body A is preferably cylindrical and is somewhat enlarged near the top by an enlarged portion 11 of annular form. Body A may be of square or other horizontal cross section but the vertical walls must be straight.

Spout C extends from near the bottom of body A upward and outward and terminates in a goose neck 20, the end of which points downward.

Cover D is hinged at 30 to body A and preferably has a catch 31 as is customary. Preferably its top is provided with a series of perforations 32 which can be opened or closed by means of a rotary cover 33 of a well known type. Thereby air may be admitted to the interior and steam may be permitted to escape.

Extending vertically upward from the center of cover D is a tubular guide 40 which may be cylindrical, but is preferably square in cross section. This guide 40 incloses carrier rod 41 to the bottom of which is fixed an imperforate plate which serves as a carrier 42 and is a very little smaller than the interior cross sectional area of body A. To the upper end of rod 41 is attached the cross handle 43 against which bears the coiled withdrawing spring 44 which passes around carrier rod 41 between the handle 43 and the top of cover D. Guide 40 is provided with longitudinal slots 45 which serve to guide handle 43 and thereby carrier rod 41. Extending from these slots are a plurality of notches 46 so shaped as to receive and hold handle 43 if it is turned into any one of them. Thereby rod 41 with carrier 42 can be locked in any one of several positions. If they are not locked, they will be normally raised by spring 44 to the top position shown in Fig. 4.

At the top of carrier plate 42, I arrange a plurality of clip springs 50 and 51 each fixed at one end and each having preferably a hump in the middle to receive a loop 52 at the bottom of a perforate container 53. These containers, as 53 and 55, may be of different sizes and consist substantially of a box of perforated metal or of wire gauze with a hinged top 56 having a catch 57 whereby the interior can be readily reached and the top can be locked shut.

Preferably the carrier plate 42 is provided with a lip 47 which when the carrier is at its lowest point as shown in Fig. 5 acts as a sort of prolongation of the lower end of spout C. The operation of my device is as follows: A large container as 53 may be used for coffee and a small container as 55 may be used for tea, or vice versa, or a small one may be used for a weak infusion and a large one for a strong infusion. Whichever is to be used, it is filled and then is slipped into place by passing its loop 52 under one of the springs 50 or 51 while the carrier is locked in the position shown in Fig. 3. Handle 43 is given a twist to allow the carrier and container to rise to the position shown in Fig. 4 where it is kept until the water in body A is sufficiently hot or boiling when by means of handle 43 it is depressed and locked preferably in the position shown in Fig. 1. In this position the hot water is in contact with the coffee or tea and extracts the essence thereof. According to the judgment of the operator when it has remained a sufficient time, handle 43 is turned and the carrier 42 is raised gradually through and out of the water by spring 44 up into the top D as shown in Fig. 4. The enlarged portion 11 is to prevent any water from being spilled over the top by being carried upward by the carrier 42, as when the carrier plate reaches enlarged portion 11 any water carried up by it has more freedom to run around the edges of the carrier back into the pot. If more strength is desired later, the carrier is depressed and the container allowed to remain for an additional period in contact with the water.

Carrier 42 being imperforate and of almost the same size with the interior of body A can be used as a piston so that by holding a cup underneath goose neck 20 and pressing down on handle 43 the beverage is forced up and out through spout C into the cup. This is a great advantage where a large pot is used as it is not necessary to lift it from the stove.

What I claim as my invention and desire to cover by Letters Patent, is:

1. In a tea or coffee pot, a body with straight vertical walls, a spout, and a cover, combined with a tubular guide which extends upward from the cover and has longitudinal slots, a carrier rod which extends slidably through the cover and into the guide, a handle therefor which extends through the slots in the guide, a withdrawing spring, an imperforate carrier plate fixed to the bottom of the carrier rod, one or more clip springs fixed at one end to the carrier plate, and a perforate container having a loop which engages the clip spring.

2. In a tea or coffee pot, a cylindrical body, a spout which terminates in a goose neck, and a cover, combined with a tubular guide which extends upward from the cover and has longitudinal slots, a carrier rod which extends slidably through the cover and into the guide, a handle therefor which extends through the slots in the guide, a withdrawing spring, an imperforate carrier plate fixed to the bottom of the carrier rod and somewhat smaller than the interior cross section of the body, a clip spring fixed at one end to the carrier plate, and a perforate container having a loop which engages the clip spring.

3. In a tea or coffee pot, a cylindrical body having near the top an enlarged portion, a spout which terminates in a goose neck, and a cover, combined with a tubular guide which extends upward from the cover and has longitudinal slots with a plurality of notches, a carrier rod which extends slidably through the cover and into the guide, a handle therefor which extends through the slots in the guide, a withdrawing spring, an imperforate carrier plate fixed to the bottom of the carrier rod and somewhat smaller than the cross sectional area of the body, a plurality of clip springs each fixed at one end to the carrier plate, and a perforate container having a cover and a loop which engages a clip spring.

In testimony whereof I hereto affix my signature in presence of two witnesses.

GEORGE ✕ LEFEVRE.
his mark

Witnesses:
 HENRY RAGOT,
 JOSEPH CHIETIEN.